United States Patent [19]

Stillman et al.

[11] Patent Number: 5,160,525

[45] Date of Patent: Nov. 3, 1992

[54] BIOREMEDIATION ENZYMATIC COMPOSITION

[76] Inventors: Neil W. Stillman, 1062 N. 24 St., Mesa, Ariz. 85213; Edward J. Brown, 1642 Taroka Dr., Fairbanks, Ak. 99709

[21] Appl. No.: 675,347

[22] Filed: Mar. 14, 1991

Related U.S. Application Data

[63] Continuation of Ser. No. 583,045, Sep. 14, 1990, abandoned.

[51] Int. Cl.$^5$ ............................. C05G 3/04; C02F 1/00
[52] U.S. Cl. ............................. 71/64.1; 71/6; 71/903; 210/632; 210/606; 252/532; 252/DIG. 12

[58] Field of Search .................. 210/632; 71/1, 6, 7–9, 71/27, 64.1, 903; 252/532, DIG. 12

[56] References Cited

U.S. PATENT DOCUMENTS 3,404,068  10/1968  Batistoni ........................... 71/64.1
3,635,797  1/1972  Battistoni et al. ................. 210/632

Primary Examiner—Ferris Lander
Attorney, Agent, or Firm—Reinhart, Boerner, Van Deuren, Norris & Rieselbach

[57] ABSTRACT

A chemical product and method for accelerated biodegradation of petroleum on water. The chemical product includes a fermentation product portion and a surfactant containing emulsifier portion which has a monosodium glutamate additive.

2 Claims, No Drawings

BIOREMEDIATION ENZYMATIC COMPOSITION

This is a continuation of copending application Ser. No. 07/583,045 filed on Sep. 14, 1990 and now abandoned.

The present invention is concerned generally with a product for bioremediation of polluted water and soil, including biodegradation of petroleum products contaminating the environment. More particularly, the invention is concerned with an enzymatic product for biodegradation of petroleum products contaminating soil and the surface of water and also for bioremediation and enhancement of soil condition to support healthy plant growth.

Pollution of the environment, particularly degradation and contamination of water and soil, results in extraordinary damage to the environment and attendant loss of vitality and productivity. Such pollution and general degradation also causes enormous economic losses to fishing, farming and tourist industries. Moreover, with the advent of protective environmental laws and the Super Fund, fines and lawsuits can lead to substantial economic losses to polluters. The occurrence of large scale petroleum pollution is a frequent occurrence, and a number of potential solutions for bioremediation of petroleum pollution have been tried or proposed. For example, current cleanup practices include: 1) physical removal of the polluting petroleum by use of absorption media, 2) dispersal using detergents, 3) burning, 4) microbial degradation under ideal certain conditions, 5) agglomeration of oil on water and sinking to the floor of the water body, and 6) use of organic chemicals, such as kerosene based dispersants, to dissolve and disperse the oil. All of these methodologies are quite expensive to use and have very limited usefulness. Further, even under ideal conditions these methods are often hazardous to carry out and extremely difficult to use to effectively clean up the pollution. In general therefore, bioremediation of soil and water are extremely difficult and expensive tasks.

It is therefore an object of the invention to provide an improved product and method of bioremediation of petroleum polluted soil and water.

It is another object of the invention to provide a new product and method for accelerating the safe biodegradation of petroleum pollutants.

It is a further object of the invention to provide improved products and methods for general bioremediation of soil, including the improvement of soil condition to enhance the ability of soil to support vital plant growth.

DETAILED DESCRIPTION OF PREFERRED EMBODIMENTS

Compositions prepared in accordance with the invention include mixtures of fermentation composition combined with another separate enzymatic mixture to form a material for accelerating biodegradation of petroleum products polluting water or contaminating soil.

The fermentation composition comprises a mixture of the following preferred ingredients:

| Ingredient* | Approximate Weight Percentage |
| --- | --- |
| water | 88 |
| molasses (from raw sugar) | 7 |
| unprocessed sugar | 2 |

-continued

| Ingredient* | Approximate Weight Percentage |
| --- | --- |
| malt (barley) | 1 |
| yeast | .2 |

*The listed components are readily available, conventional materials. For example, see the components listed in U.S. Pat. No. 3,404,068 which is incorporated by reference herein. Also for additional details see a contemporaneously filed patent application Ser. No. 583,045 "Soil Bioremediation Enzymatic Composition" which is incorporated by reference herein.

These ingredients can be mixed together in a container by stirring at a moderate speed. The yeast can be predissolved in warm water and dissolved in the mixture. The malt will likely not dissolve totally and will settle out during the fermentation process, which takes about 5–7 days depending on the temperature of the mixture. The undissolved malt can be filtered out prior to use of the fermentation product, either as a soil bioremediation product or as one of a two component mixtures for forming a combined different product for accelerating biodegradation of petroleum products contaminating soil or the surface of water.

Enzymatic Oil Degradation Product

The fermentation product described above can be used as one of two component mixtures which are mixed to form a new product for accelerating biodegradation of petroleum contaminants in soil or on the surface of water. In a first phase of preparation, the fermentation product is obtained in the manner described above and then mixed with a second mixture comprising the following ingredients:

| Ingredient | Wt. Percentage (after combining with fermentation product) |
| --- | --- |
| water | 83–88* |
| TERGITOL (a trademark of Union Carbide Corporation) (15-S-9 nonionic ethoxylated secondary alcohol 8–9 moles of ethylene oxide) | <2 |
| SURFONIC L 24-7 (a trademark of Texaco Corporation) (nonionic surfactant ethoxylated linear alcohol 6–7 moles of ethylene oxide) | <2 |
| Sodium Borate (Potassium Borate tetrahydrate) | 2–3 |
| Citric Acid (ascorbic acid) | <0.5 |
| Lactic Acid | <1 |
| Tripolyphosphate (Sodium Tri basic phosphate or monobasic or dibasic phosphate) | <2 |
| Monosodium Glutamate or Urea | ≦5 |

*Water can be added all at once or ~33% at the start of mixing of the other components and then add 50–55% more water.

These ingredients should be mixed slowly, particularly when adding the tripolyphosphate or lumps will collect. High speed agitation can cause foaming. Once this second mixture is thoroughly mixed, the fermentation product can be added and mixed to form the final enzymatic product. The density should be about 1.04 g/cc and a pH ~7.4–7.6.

The above formulation has some of the components present in an enzymatic composition set forth in U.S. Pat. No. 3,635,797 which is incorporated by reference herein. Although there are some compositional similarities, there are key distinctions which give rise to greatly enhanced effectiveness in biodegradation of oil on water as illustrated in the data of the examples. In particular, excellent improvement is obtained when using the monosodium glutamate. The activity of the instant product is much greater than in the '797 patent, while not requiring the use of any type of catalyst, such as the magnesium salt present in the '797 patent. The two surfactants used in the above described composition are believed to perform two functions. The TERGITOL surfactants act to disperse and break down oil on water, while the SURFONIC surfactants act as carriers for biological media which attach and biodegrade the oil. In the preferred form of the invention, both these types of surfactants, or their equivalent, are present.

EXAMPLES

By way of illustration and without limitation, the following examples illustrate preparation and testing of a number of varying embodiments of the inventions.

EXAMPLE 1

A fermentation product was prepared using the following ingredients (additional nonessential details of this product can be noted in a contemporaneously filed application entitled "Bioremediation Enzymatic Composition" which is incorporated by reference herein):

| Ingredients | Weight (g) |
| --- | --- |
| water (soft, tap water or deionized) | 669 |
| dark molasses (Brer Rabbit) | 56 |
| Tubinado sugar (unrefined) | 16.8 |
| malt (barley) | 7.65 |
| Brewer's or baker's dry yeast | 0.83 |

The water and dark molasses were stirred solution and then mixed thoroughly with the remaining ingredients. The mixture had a pH of about 5.7, and the mixture was stored at room temperature (75° F.) in a dark cabinet. Fermentation was observed to be occurring the next day, and the solution was a dark brown color. The sample was occasionally stirred, and fermentation was completed ten days later. Other yeasts were also tried and details can be obtained by reference to the contemporaneously filed application "Bioremediation Enzymatic Composition" incorporated by reference herein.

EXAMPLE 2

A variety of enzymatic compositions for accelerating biodegradation were made using the fermentation product described hereinbefore and the second group ("Emulsified Portion") is the emulsifier or enzymatic mixture to be combined with the fermentation product to produce a bioremediation enzymatic treatment composition:

| Emulsified Portion Ingredient | Sample (a) wt. (g) | (b) wt. (g) | (c) wt. (g) |
| --- | --- | --- | --- |
| water (soft, tap) | 668 | — | — |
| SURFONIC-24-7 (Texaco, Inc.) | 40.5 | 60.0 | — |
| SURFONIC-24-9 (Texaco, Inc.) | — | 54.0 | 40.5 |
| TERGITOL-15-S-7 (Union Carbide) | 36.2 | — | — |
| TERGITOL-15-S-9 (Union Carbide) | — | — | 36.2 |
| Sodium Borate | 51.8 | 77.0 | 51.8 |
| Citric Acid | 43.5 | 5.2 | 67.5 |
| Lactic Acid | 19.0 | 28.0 | 19.0 |
| Urea | 126 | 126 | 126 |
| water (after mixing all above) | 1147 | 1147 | 1147 |
| Total Weight | 2882 g | 2860 g | 2906 g |

Samples (a) and (c) were mixed together by H2O Chemicals, Inc., and were sent for evaluation at the University of Alaska, Fairbanks. Test results will be cited hereinafter (see Example 4 and cited as data for EC-U samples).

EXAMPLE 3

A subsequent specimen like Example 2 (c) was prepared but with the substitution of monosodium glutamate for urea. This specimen was also evaluated for performance of accelerating biodegradation of oil in water. Results of these tests will be provided hereinafter (see Example 4, data cited as "Modified Product").

EXAMPLE 4

This example illustrates that results performed concerning the effectiveness of the instant product versus a prior art material in converting hexadecane to $CO_2$:

| Sample | Mineral Nutrients in nature (no enzyme composition (EC) | Mineral Nutrients in nature 1/50 (ECU)* | Mineral Nutrients in nature 1/500 (ECU)* | Mineral Nutrients in nature 1/1000 (ECU)* | Mineral Nutrients in nature 1/50 Modified Product (3) | Mineral Nutrients in nature 1/500 Modified Product | Mineral Nutrients in nature 1/1000 Modified Product | Mineral Nutrients in nature 1/10 Modified Product Autoclaved |
| --- | --- | --- | --- | --- | --- | --- | --- | --- |
| Hexadecane Transformation (Z transformed to CO2) Mean of 3 trials | 16 | 3.1 | 6.3 | 6.7 | 19.3 | 50 | 43.7 | 0 |
|  |  |  |  |  | Need more time so bacteria can use up molasses & convert to Hydrocarbon | 300 increase proven efficacy Should totally eliminate |  |  |

-continued

Mineralization of Hexadecane by a Microbiol Consortium From Prince William Sound, Alaska (1)

| Sample | Mineral Nutrients in nature (no enzyme composition (EC) | Mineral Nutrients in nature 1/50 (ECU)* | Mineral Nutrients in nature 1/500 (ECU)* | Mineral Nutrients in nature 1/1000 (ECU)* | Mineral Nutrients in nature 1/50 Modified Product (3) | Mineral Nutrients in nature 1/500 Modified Product | Mineral Nutrients in nature 1/1000 Modified Product | Mineral Nutrients in nature 1/10 Modified Product Autoclaved |
|---|---|---|---|---|---|---|---|---|
| Hydrocarbons | | | | | | | | |

1. Consortium was in incubated for 70 hours with 100 ug of labeled hexadecane per 10 ml sample.
*See Example 2 for composition.
See Example 3 for composition.

EXAMPLE 5

A test of the bioremediation performance of an enzymatic composition of the invention for petroleum hydrocarbon in soil was performed by the Northern Testing Laboratories, Inc., Fairbanks, Ak. A pretreatment EPA 418.1 determination was done in duplicate, using approximately 15 grams of soil per sample. Pretreatment levels were found to be 737 and 603 mg/dry kg.

The measurement for the soils were conducted by volume since the treatment instructions are based on soil volume. Five hundred milliliters of soil were divided into two portions of 250 ml each, for treatment and control. Each portion was spread evenly in the bottom of a clean, freon-rinsed 2000-ml beaker, forming a layer approximately two centimeters deep. Seven milliliters of product were diluted to 700 ml with deionized water.

The treatment consisted of three applications (approximately 233 ml each) of diluted product at approximately 48-hour intervals. The liquid was simply poured over the top of the soil layer. At the time of each application, the control portion received 233 ml of deionized water. Between treatments, the beakers were covered tightly with aluminum foil and held at approximately 62 degrees Fahrenheit.

Treatment

1: Friday Mar. 9 at 5:00 p.m.
2: Sunday Mar. 11 at 2:00 p.m.
3: Tuesday Mar. 13 at 4:45 p.m.

The treatment ended Thursday Mar. 15 at 7:00 p.m. when the treated and control soils were drained. On Friday Mar. 16, samples of approximately 15 grams were taken from each portion and analyzed for TPH, yielding the following results:
Control sample: 767 mg/dry kg
Treated sample: 391 mg/dry kg Listed below are quality control assurance reference samples with a known concentration prior to analysis. The acceptable limits represent a 95% confidence interval established by the Environmental Protection Agency or by our laboratory through repetitive analyses of the reference sample. The reference samples indicated below were analyzed at the same time as your sample, ensuring the accuracy of your results.

A quality control test was also performed to insure accuracy of the aforementioned test.

| Sample # | Parameter | Unit | Result | Acceptable Limit |
|---|---|---|---|---|
| EPA 379-1 | Oil & Grease | mg/l | 19.1 | 16.6–23.4 |

EXAMPLE 6

Further performance tests were carried out by Chemical Analysis, Inc. to determine the effectiveness of the Example 3 enzymatic composition to biodegrade a petroleum hydrocarbon material known as BETX solution:

| COMPONENTS | % BY VOLUME |
|---|---|
| Benzene | 5.0 |
| Ethylbenzene | 5.0 |
| Toluene | 5.0 |
| Xylene | 5.0 |
| Florida Sea Water | 80.0 |
| TOTAL | 100.0% |

Solution II: Oil Spill Formulation-Florida Sea Water

| COMPONENTS | % BY VOLUME |
|---|---|
| Oil Spill Formulation | 0.20 |
| Florida Sea Water | 99.80 |
| TOTAL | 100.00% |

The percentage ratio of these two components represents a 1 to 500 mix ratio respectively.

Solution III: BETX/Oil Spill Formulation-Florida Sea Water

| COMPONENTS | % BY VOLUME |
|---|---|
| Solution I | 50.0 |
| Solution II | 50.0 |
| TOTAL | 100.0% |

Solution IV: BETX/Oil Spill Formulation-Florida Sea Water Solution

| COMPONENTS | % BY VOLUME |
|---|---|
| Solution III | 50.0 |
| Florida Sea Water | 50.0 |
| TOTAL | 100.0% |

Final Solution Composition:

| COMPONENTS | % BY VOLUME |
|---|---|
| Aromatics | 5.0 |
| Oil Spill Formulation Additive | 0.05 (1:2000 Weight Ratio) |
| Florida Sea Water | 94.95 |

-continued

| COMPONENTS | % BY VOLUME |
|---|---|
| TOTAL | 100.00% | effective as 1/100. The effect of oxygen takeup was observed to be 178 mg/L for the enzymatic composition at 1/500 concentration, and 12 for seawater and 8 for oil. The net effect of the enzymatic composition was 512 mg/L. Below are listed the tabulated results:

Oil Spill Formulation* Respirocity Results (Example 3 for composition)

| Sample | Oil | Additive | Seawater | Accumulated Oxygen Uptake | | | | Aliphatic Content | | | | Aromatic Content | | Percent Aliphatic Decrease | Percent Aromatic Decrease |
|---|---|---|---|---|---|---|---|---|---|---|---|---|---|---|---|
| | | | | 0 mg/L | 10 mg/L | 20 mg/L | 30 days mg/L | 0 ppm | 10 ppm | 20 ppm | 30 days ppm | 0 ppm | 30 days ppm | | |
| 1 | + | 1/500 | + | 16 | 380 | 620 | 690 | 712 | 570 | 233 | 151 | 246 | 133 | 79 | 46 |
| 2 | + | 1/500 | + | 18 | 410 | 660 | 730 | 693 | 542 | 274 | 138 | 240 | 149 | 80 | 38 |
| 3 | — | 1/500 | + | 5 | 152 | 174 | 186 | — | — | — | — | — | — | — | — |
| 4 | — | 1/500 | + | 5 | 141 | 168 | 194 | — | — | — | — | — | — | — | — |
| 5 | — | — | + | 0 | 5 | 8 | 12 | — | — | — | — | — | — | — | — |
| 6 | — | — | + | 0 | 6 | 8 | 11 | — | — | — | — | — | — | — | — |
| 7 | + | — | + | 2 | 12 | 18 | 22 | 705 | 710 | 695 | 682 | 251 | 248 | 3 | 1 |
| 8 | + | — | + | 3 | 13 | 16 | 19 | 684 | 680 | 681 | 675 | 238 | 237 | 1 | 0 |
| 9 | + | 1/100 | + | 26 | 460 | 680 | 770 | 690 | 512 | 210 | 105 | 245 | 115 | 85 | 53 |
| 10 | + | 1/100 | + | 33 | 520 | 740 | 810 | 695 | 486 | 260 | 89 | 250 | 127 | 87 | 49 |

*Batch No. 124-E

The final solution identifies the composition of the final mixture when the various solutions are prepared and mixed together based on the procedural instructions. The resultant final solution was allowed to stir for a period of (96) hours and the volume of BETX aromatic content was evaluated. The initial percent volume of aromatic discontinuous phase in the final solution represented five percent after the test. As a result of the evaluation, it was observed that 1.6% of the BETX solution had been degraded of the discontinuous aromatic phase; this represented a 32% volume reduction in the aromatic content. Turbidity was observed to have increased in the water phase which indicated that incompatible components were incorporated into the water phase.

The 1:2000 weight ratio concentration of oil spill formulation in the final solution is based on the assumption that the oil spill formulation additive is 100% active; if the oil spill formulation is less than 100% active, then one needs to proportionate the concentration accordingly.

EXAMPLE 7

An additional test of the ability to reduce total petroleum hydrocarbon (TPH) was performed by the Savannah Laboratories and Environmental Services, Inc.

| Extraction No. | Time (d) | TPH mg(1) |
|---|---|---|
| 0 | 0 | 100,000 |
| 2 | 2 | 6,800 (uncorrected .—*48,000) |
| 4 | 12 | 5,300 |
| 6 | 19 | 900 |
| 7 | 23 | 150 |

*corrected for dilution

EXAMPLE 8

Respirocity tests were performed by Chemical Analysis, Inc., Irving, Tex. The enzymatic composition (see, for example Example 7) analyzed was used in two different concentrations, 1/100 and 1/500 in solution. The concentration of the oil was 1,000 parts per million. The general effect on decreasing the aliphatic context of the oil was in the range of 80% and the decrease of the aromatic context was in the range of 40%. An additive concentration of about 1/500 appears to be substantially

EXAMPLE 9

Detailed tests were also performed on the effect of the inventive enzymatic composition on mysid organisms using the procedures recommended by the U.S. Environmental Protection Agency. The test was conducted at a temperatures of 20° to 26° C. with five concentrations of test composition and a dilution water control. The five concentrations used were: 0 mg/L, 1 mg/L, 10 mg/L, 100 mg/L, 1,000 mg/L and 10,000 mg/L. The test results are shown in the table below:

Survival Data From Toxicity Tests

| Nominal Concentration (mg/L) | Number Alive | | | | | Number Affected | | | | |
|---|---|---|---|---|---|---|---|---|---|---|
| | 0 hr | 24 hr | 48 hr | 72 hr | 96 hr | 0 hr | 24 hr | 48 hr | 72 hr | 96 hr |
| 0 (control) | 1 | 10 | 10 | 10 | 10 | 10 | 0 | 0 | 0 | 0 | 0 |
| 1 | 1 | 10 | 10 | 9 | 9 | 9 | 0 | 0 | 0 | 0 | 0 |
| 10 | 1 | 10 | 10 | 9 | 9 | 9 | 0 | 0 | 0 | 0 | 0 |
| 100 | 1 | 10 | 10 | 10 | 9 | 9 | 0 | 0 | 0 | 0 | 0 |
| 1,000 | 1 | 10 | 9 | 9 | 8 | 8 | 0 | 0 | 0 | 0 | 0 |
| 10,000 | 1 | 10 | 0 | 0 | 0 | 0 | 0 | — | — | — | — |

While preferred embodiments of the invention have been shown and described, it will be clear to those skilled in the art that various changes and modifications can be made without departing from the invention in its broader aspects as set forth in the claims provided hereinafter.

I claim:

1. A chemical product for accelerated biodegradation of petroleum on water consisting essentially of a mixture of a fermentation portion and an enzymatic portion comprising about 85% by weight water, about 2% by weight of a nonionic ethoxylated secondary alcohol having about 6-9 moles of ethylene oxide and 2% of a nonionic surfactant ethoxylated linear alcohol having about 6-9 moles of ethylene oxide, about 2-3% sodium borate, 0.2% by weight citric acid, about 1% by weight lactic acid, about 2% by weight tripolyphosphate and the balance monosodium glutamate.

2. A method of manufacturing a chemical product for accelerated biodegradation of petroleum on water, consisting essentially of the steps of:

preparing a fermentation composition by mixing the following approximate weight percentage materials: 88% water, 7% molasses, 2% unprocessed sugar, 1% malt and 0.2% yeast; then mixing said materials and then fermenting said mixed materials for 5-7 days; and mixing said fermented mixed materials with a second mixture having weight percentages after combining with said fermented mixed materials of the following: about 83-88% water, about 2% nonionic ethoxylated secondary alcohol having about 6-9 moles of thylene oxide, about 2% nonionic surfactant ethoxylated linear alcohol having about 6-9 moles of ethylene oxide, about 2-3% sodium borate, about 0.5% ascorbic acid, about 1% lactic acid, about 2% tripolyphosphate and about 2.5% monosodium glutamate.

* * * * *

UNITED STATES PATENT AND TRADEMARK OFFICE
CERTIFICATE OF CORRECTION

PATENT NO. : 5,160,525
DATED     : November 3, 1992
INVENTOR(S) : Neil W. Stillman and Edward J. Brown It is certified that error appears in the above-identified patent and that said Letters Patent is hereby corrected as shown below:

Column 3, Line 34,   after "stirred", insert -- to form a uniform --;

Column 8, Line 63,   after "acid" insert -- or ascorbic acid --;

Column 10, Line 3,   cancel "thylene" and insert -- ethylene --;

Column 10, Line 6,   after "0.5%" insert -- citric acid or --.

Signed and Sealed this

Twenty-first Day of December, 1993

Attest:

BRUCE LEHMAN

*Attesting Officer*   Commissioner of Patents and Trademarks